(12) United States Patent
Nakamura et al.

(10) Patent No.: US 8,423,223 B2
(45) Date of Patent: Apr. 16, 2013

(54) VEHICLE PARKING ASSIST SYSTEM, VEHICLE INCLUDING THE SAME, AND VEHICLE PARKING ASSIST METHOD

(75) Inventors: Toru Nakamura, Toyota (JP); Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/508,871

(22) PCT Filed: Mar. 9, 2011

(86) PCT No.: PCT/IB2011/000498
§ 371 (c)(1),
(2), (4) Date: May 9, 2012

(87) PCT Pub. No.: WO2011/110924
PCT Pub. Date: Sep. 15, 2011

(65) Prior Publication Data
US 2012/0323423 A1    Dec. 20, 2012

(30) Foreign Application Priority Data

Mar. 10, 2010   (JP) ................................. 2010-053208

(51) Int. Cl.
*B60L 9/00* (2006.01)
*B60L 11/00* (2006.01)
*G05D 3/00* (2006.01)
*G06F 7/00* (2006.01)

(52) U.S. Cl.
USPC .............................. 701/22; 340/932.2; 455/39

(58) Field of Classification Search .................... 701/22, 701/23, 41, 70, 116; 340/932.2, 988, 436, 340/437, 438; 348/148; 455/39
See application file for complete search history.

(56) References Cited

U.S. PATENT DOCUMENTS 5,869,910 A    2/1999  Colens
7,239,958 B2 *  7/2007  Grougan et al. .............. 701/467
(Continued)

FOREIGN PATENT DOCUMENTS

DE   10 2008 046 215 A1   9/2009
EP      1 930 203 A1        6/2008
(Continued)

OTHER PUBLICATIONS

Written Opinion of the International Searching Authority issued in Application No. PCT/IB2011/000498; Dated Jun. 24, 2011.

(Continued)

*Primary Examiner* — Mary Cheung
*Assistant Examiner* — Rodney Butler
(74) *Attorney, Agent, or Firm* — Oliff & Berridge, PLC

(57) ABSTRACT

A vehicle parking assist system includes: a camera; a first vehicle guiding section that recognizes the position of a power transmitter external to a vehicle based on the image obtained via the camera to guide the vehicle to the power transmitter; a power receiver that receives electric power from the power transmitter in a non-contact manner; and a second vehicle guiding section that guides the vehicle based on the electric power received by the power receiver. The control section executes a process of stopping the vehicle when the electric power received by the power receiver from the power transmitter does not satisfy a first condition, even after the control section has caused the vehicle driving section to move the vehicle beyond a predetermined distance after the first vehicle guiding section becomes unable to detect the position of the power transmitter based on the image.

11 Claims, 13 Drawing Sheets

U.S. PATENT DOCUMENTS

| | | | |
|---|---|---|---|
| 2008/0266137 A1* | 10/2008 | Son | 340/932.2 |
| 2010/0156672 A1* | 6/2010 | Yoo et al. | 340/932.2 |
| 2010/0161216 A1* | 6/2010 | Yamamoto | 701/207 |
| 2010/0225271 A1 | 9/2010 | Oyobe et al. | |
| 2011/0121778 A1 | 5/2011 | Oyobe et al. | |
| 2012/0043172 A1 | 2/2012 | Ichikawa | |

FOREIGN PATENT DOCUMENTS

| | | |
|---|---|---|
| JP | 2004-291865 A | 10/2004 |
| JP | A-2004-291865 | 10/2004 |
| JP | 2006-345588 A | 12/2006 |
| JP | A-2006-345588 | 12/2006 |
| JP | A-2007-097345 | 4/2007 |
| WO | WO 95/2219 A1 | 8/1995 |
| WO | WO 2008/051611 A2 | 5/2008 |
| WO | WO 2009/054221 A1 | 4/2009 |
| WO | WO 2010/006078 | 1/2010 |
| WO | WO 2010/052785 | 5/2010 |
| WO | WO 2010/052785 A1 | 5/2010 |
| WO | WO 2010/131346 A1 | 11/2010 |

OTHER PUBLICATIONS

International Search Report issued in Application No. PCT/IB2011/000498; Dated Jun. 24, 2011.

* cited by examiner

VEHICLE PARKING ASSIST SYSTEM, VEHICLE INCLUDING THE SAME, AND VEHICLE PARKING ASSIST METHOD

BACKGROUND OF THE INVENTION

1. Field of the Invention

The invention relates to a vehicle parking assist system, a vehicle including the vehicle parking assist system, and a vehicle parking assist method and in particular, to a vehicle parking assist system and method that perform a parking assist operation with the use of an electric power receiving section that receives electric power in a non-contact manner, and to a vehicle including the vehicle parking assist system.

2. Description of the Related Art

Vehicles, such as pure electric vehicles and plug-in hybrid vehicles, that are configured to be able to charge an electricity storage device on the vehicle from an external power source are in actual use. Technologies for automatically charging and technologies for guiding the vehicle for this purpose are being studied.

Japanese Patent Application Publication No. 2007-97345 (JP-A-2007-97345) describes a technology for performing the alignment assist control, in which when an indicator of an electric power transmitting unit exists near the target parking position in the image captured by a back monitor camera that captures the image of an area near the vehicle, the position of the indicator is recognized.

However, the technologies described in JP-A-2007-97345 do not take into consideration the fact that the indicator of the electric power transmitting unit becomes positioned in the blind spot of the back monitor camera. In particular, unless an overrun of the vehicle is prevented when the vehicle is approaching the electric power transmitting unit, a situation can occur, in which the vehicle is unintentionally brought into contact with the electric power transmitting unit etc. On the other hand, when the vehicle is caused to stop well before the electric power transmitting unit to avoid the overrun, a situation can occur, in which the position of the vehicle is not appropriate to perform charging. Thus, there is a room for improvement in order to accurately guide the vehicle even after the indicator becomes positioned in the blind spot of the camera.

SUMMARY OF THE INVENTION

The invention provides a vehicle parking assist system and method, with which it is possible to minimize the positional deviation from the parking position, at which the vehicle is to be stopped, and provides a vehicle including the vehicle parking assist system.

A first aspect of the invention is a vehicle parking assist system including: a camera that captures an image of an area near a vehicle; a first vehicle guiding section that recognizes a position of an electric power transmitting unit external to the vehicle based on the image obtained via the camera to guide the vehicle to the electric power transmitting unit; an electric power receiving section that receives electric power from the electric power transmitting unit in a non-contact manner; a second vehicle guiding section that guides the vehicle based on the electric power received by the electric power receiving section; and a control section that causes the vehicle to move by controlling a vehicle driving section that drives the vehicle, based on outputs from the first and second vehicle guiding sections. The control section executes a process of stopping the vehicle when the electric power received by the electric power receiving section from the electric power transmitting unit does not satisfy a first condition that the electric power is equal to or higher than a first threshold value, even after the control section has caused the vehicle driving section to move the vehicle beyond a predetermined distance after the first vehicle guiding section becomes unable to detect the position of the electric power transmitting unit based on the image.

The first threshold value may be determined by measuring a relation between a distance between the electric power transmitting unit and the electric power receiving section and a voltage in advance.

The control section may stop receiving the electric power via the electric power receiving section and discontinue a guide performed by the second vehicle guiding section when the electric power received by the electric power receiving section from the electric power transmitting unit does not satisfy the first condition even after the control section has caused the vehicle driving section to move the vehicle beyond the predetermined distance after the first vehicle guiding section becomes unable to detect the position of the electric power transmitting unit based on the image.

The control section may end the guide performed by the second vehicle guiding section and start preparing for charging an electricity storage device on the vehicle via the electric power transmitting unit when the electric power received by the electric power receiving section from the electric power transmitting unit satisfies the first condition before the vehicle has been moved the predetermined distance after the first vehicle guiding section becomes unable to detect the position of the electric power transmitting unit based on the image.

A configuration may be employed, in which, after the control section automatically stops the vehicle and discontinues the guide performed by the second vehicle guiding section, the control section restarts transmitting or receiving the electric power via the electric power receiving section in response to an instruction from an operator, and the control section starts charging the electricity storage device on the vehicle via the electric power transmitting unit when the electric power received by the electric power receiving section from the electric power transmitting unit satisfies a second condition that the electric power is equal to or higher than a second threshold value, and on the other hand, the control section warns the operator when the electric power received by the electric power receiving section from the electric power transmitting unit does not satisfy the second condition.

The second threshold value may be smaller than the first threshold value.

The second threshold value may be determined based on an allowable leaking electromagnetic field intensity that is an intensity of the electromagnetic field that leaks when power transmission and reception at a maximum power output is performed.

The instruction may be provided by the operator by bringing the vehicle driving section into a parking state.

The electric power receiving section may include an electric power receiving coil that receives the electric power in a non-contact manner via electromagnetic field resonance from an electric power transmitting coil of the electric power transmitting unit.

A second aspect of the invention is a vehicle including the above vehicle parking assist system.

A third aspect of the invention is a vehicle parking assist method including: based on an image obtained via a camera that captures an image of an area near a vehicle, recognizing a position of an electric power transmitting unit external to the vehicle; guiding the vehicle to the electric power transmitting unit based on the image; receiving electric power from the electric power transmitting unit via an electric power receiving section that receives the electric power in a non-contact manner; guiding the vehicle based on the electric power received by the electric power receiving section; causing the vehicle to move by performing control to drive the vehicle, according to the guiding based on the image and the guiding based on the electric power; and stopping the vehicle when the electric power received by the electric power receiving section from the electric power transmitting unit does not satisfy a first condition that the electric power is equal to or higher than a first threshold value, even after the vehicle has been moved beyond a predetermined distance after it becomes impossible to detect the position of the electric power transmitting unit based on the image.

The first threshold value may be determined by measuring a relation between a distance between the electric power transmitting unit and the electric power receiving section and a voltage in advance.

The vehicle parking assist method may further include stopping the receiving the electric power via the electric power receiving section and discontinuing the guiding based on the electric power when the electric power received by the electric power receiving section from the electric power transmitting unit does not satisfy the first condition even after the vehicle has been moved beyond the predetermined distance after it becomes impossible to detect the position of the electric power transmitting unit based on the image.

The vehicle parking assist method may further include ending the guiding based on the electric power and starting preparing for charging an electricity storage device on the vehicle via the electric power transmitting unit when the electric power received by the electric power receiving section from the electric power transmitting unit satisfies the first condition before the vehicle has been moved the predetermined distance after it becomes impossible to detect the position of the electric power transmitting unit based on the image.

The vehicle parking assist method may further include: after the vehicle is automatically stopped and the guiding based on the electric power is discontinued, restarting the transmitting or receiving the electric power via the electric power receiving section in response to an instruction from an operator; starting charging the electricity storage device on the vehicle via the electric power transmitting unit when the electric power received by the electric power receiving section from the electric power transmitting unit satisfies a second condition that the electric power is equal to or higher than a second threshold value; and warning the operator when the electric power received by the electric power receiving section from the electric power transmitting unit does not satisfy the second condition.

According to the invention, during a vehicle parking assist operation, even after the vehicle comes close to the parking position, the vehicle is accurately guided and the overrun is monitored and prevented, so that it is possible to minimize the positional deviation from the parking position, at which the vehicle is to be stopped.

BRIEF DESCRIPTION OF THE DRAWINGS

The foregoing and further objects, features and advantages of the invention will become apparent from the following description of an example embodiment with reference to the accompanying drawings, wherein like numerals are used to represent like elements and wherein.

DETAILED DESCRIPTION OF EMBODIMENTS

Figure 1:
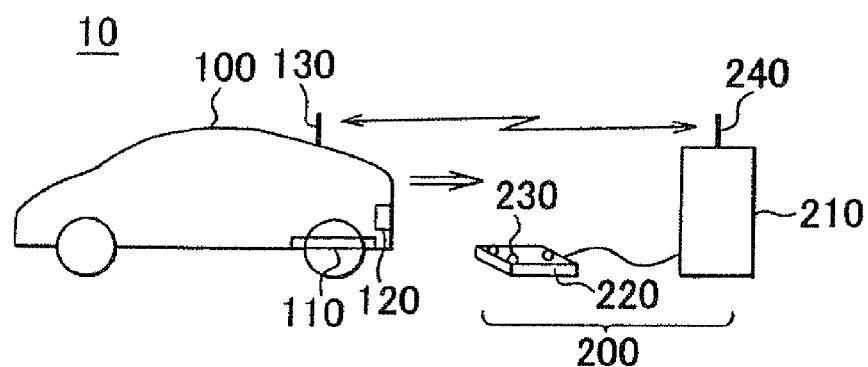
FIG. 1 is an overall configuration diagram of a vehicle power supply system according to an embodiment of the invention.

An embodiment of the invention will be described in detail below with reference to drawings. Note that the same or corresponding portions in the drawings are designated by the same reference numeral and the description thereof is not repeated.

FIG. 1 is an overall configuration diagram of a vehicle power supply system according to the embodiment of the invention. Referring to FIG. 1, the vehicle power supply system 10 includes a vehicle 100 and a power supply apparatus 200. The vehicle 100 includes an electric power receiving unit 110, a camera 120, and a communication unit 130.

The electric power receiving unit 110 is installed at the bottom of a Vehicle body and is configured to receive, in a non-contact manner, electric power sent from an electric power transmitting unit 220 of the power supply apparatus 200. More specifically, the electric power receiving unit 110 includes a self-resonant coil to be described later, and receives, in a non-contact manner, electric power from the electric power transmitting unit 220 by resonating with a self-resonant coil included in the electric power transmitting unit 220 via electromagnetic field. The camera 120 is provided to detect the positional relation between the electric power receiving unit 110 and the electric power transmitting unit 220 and is installed on the vehicle body so as to be able to capture an image of a rear view from the vehicle, for example. The communication unit 130 is a communication interface for communication between the vehicle 100 and the power supply apparatus 200.

The power supply apparatus 200 includes a high-frequency power supply device 210, the electric power transmitting unit 220, a luminous portion 230, and a communication unit 240. The high-frequency power supply device 210 converts commercial alternating-current (AC) power supplied from the system power supply into a high-frequency electric power and outputs the high-frequency electric power to the electric power transmitting unit 220. The frequency of the high-frequency AC power generated by the high-frequency power supply device 210 is, for example, one megahertz to several dozen megahertz.

The electric power transmitting unit 220 is fixed on a floor of a parking lot, or car park, and is configured to transmit, to the electric power receiving unit 110 of the vehicle 100 in a non-contact manner, the high-frequency AC power supplied from the high-frequency power supply device 210. More specifically, the electric power transmitting unit 220 includes a self-resonant coil and transmits, in a non-contact manner, electric power to the electric power receiving unit 110 by resonating with the self-resonant coil included in the electric power receiving unit 110 via electromagnetic field. A plurality of the luminous portions 230 are provided on the electric power transmitting unit 220 so as to indicate the position of the electric power transmitting unit 220. Examples of the luminous portion 230 include light emitting diodes. The communication unit 240 is a communication interface for communication between the power supply apparatus 200 and the vehicle 100.

In this vehicle power supply system 10, high-frequency AC power is transmitted from the electric power transmitting unit 220 of the power supply apparatus 200, and the self-resonant coil included in the electric power receiving unit 110 of the vehicle 100 and the self-resonant coil included in the electric power transmitting unit 220 resonate with each other via electromagnetic field, thereby supplying electric power from the power supply apparatus 200 to the vehicle 100.

When the electric power is supplied from the power supply apparatus 200 to the vehicle 100, it is necessary to align the electric power receiving unit 110 of the vehicle 100 and the electric power transmitting unit 220 of the power supply apparatus 200 by guiding the vehicle 100 to the power supply apparatus 200.

The alignment is conducted as follows. In the first step, the positional relationship between the electric power receiving unit 110 of the vehicle 100 and the electric power transmitting unit 220 of the power supply apparatus 200 is detected based on the image captured by the camera 120, and the vehicle is controlled, based on the detection result, so that the vehicle is guided to the electric power transmitting unit 220. More specifically, the plurality of luminous portions 230 provided on the electric power transmitting unit 220 are captured by the camera 120 and the positions and the orientations of the plurality of luminous portions 230 are recognized by image recognition. Then, based on the result of the image recognition, the relative position and orientation between the electric power transmitting unit 220 and the vehicle are recognized and the vehicle is guided to the electric power transmitting unit 220 based on the result of recognition.

Since the area in which the electric power receiving unit 110 and the electric power transmitting unit 220 face each other is smaller than the area of the bottom surface of the vehicle body, the electric power transmitting unit 220 cannot be captured by the camera 120 when the electric power transmitting unit 220 becomes positioned under the vehicle body. When this occurs, the alignment control is switched from the first step to the second step. In the second step, electric power is supplied from the electric power transmitting unit 220 to the electric power receiving unit 110 and the distance between the electric power transmitting unit 220 and the electric power receiving unit 110 is detected based on the power supply status. Based on this distance information, the vehicle is controlled so that the electric power transmitting unit 220 and the electric power receiving unit 110 are aligned with each other.

The magnitude of the electric power transmitted as a test signal from the electric power transmitting unit 220 in the second step is set smaller than the charging electric power that is supplied from the electric power transmitting unit 220 to the electric power receiving unit 110 after the completion of the alignment of the electric power transmitting unit 220 with the electric power receiving unit 110. The reason why the electric power is transmitted from the electric power transmitting unit 220 in the second step is to detect the distance between the electric power transmitting unit 220 and the electric power receiving unit 110 and for this purpose, high electric power to be used when the main power supply operation is performed is not needed.

Next, a non-contact power supply method used in the vehicle power supply system 10 according to this embodiment will be described. In the vehicle power supply system 10 according to this embodiment, electric power is supplied from the power supply apparatus 200 to the vehicle 100 by the resonance method.

Figure 2:
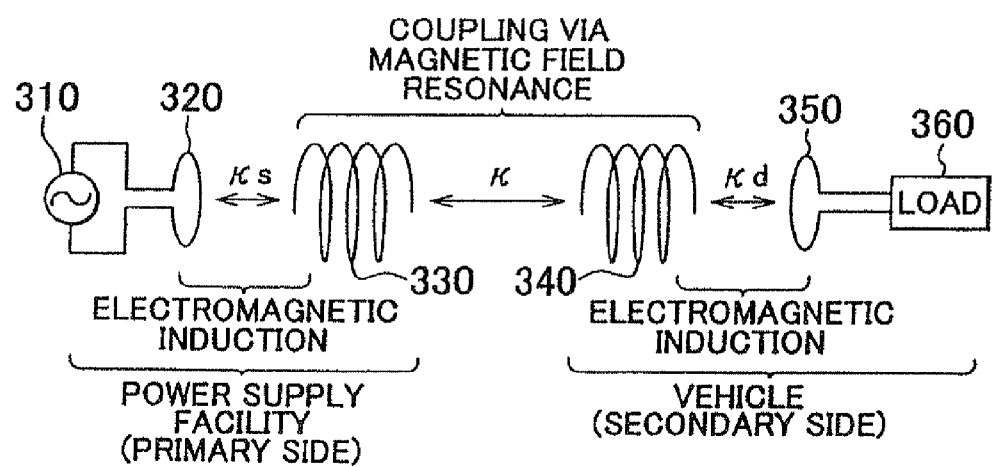
FIG. 2 is a diagram for explaining the principles of power transmission using the resonance method.

FIG. 2 is a diagram for explaining the principles of power transmission using the resonance method. Referring to FIG. 2, in the resonance method, as in the case of the resonance of two tuning forks, electric power is transmitted from one coil to the other coil via electromagnetic field due to the resonance of two LC resonant coils having the same eigenfrequency in the electromagnetic field (near field).

Specifically, a primary coil 320 is connected to a high-frequency AC power supply 310 and the high-frequency AC power of one megahertz to several dozen megahertz is supplied, via electromagnetic induction, to the primary self-resonant coil 330 that is magnetically coupled to the primary coil 320. The primary self-resonant coil 330 is an LC resonator using the inductance of the coil itself and the stray capacitance and the primary self-resonant coil 330 resonates with the secondary self-resonant coil 340 having the resonance frequency the same as that of the primary self-resonant coil 330 via electromagnetic field (near field). As a result, energy (electric power) is transferred from the primary self-resonant coil 330 to the secondary self-resonant coil 340 via electromagnetic field. The energy (electric power) transferred to the secondary self-resonant coil 340 is received, via electromagnetic induction, by the secondary coil 350 that is magnetically coupled to the secondary self-resonant coil 340, and is then supplied to the load 360. The electric power transmission by the resonance method is performed when the Q factor that indicates the intensity of resonance of the primary self-resonant coil 330 and the secondary self-resonant coil 340 is greater than 100, for example.

With regard to the correspondences between FIG. 1 and FIG. 2, the electric power receiving unit 110 in FIG. 1 corresponds to the secondary self-resonant coil 340 and the secondary coil 350, and the electric power transmitting unit 220 in FIG. 1 corresponds to the primary coil 320 and the primary self-resonant coil 330.

Figure 3:
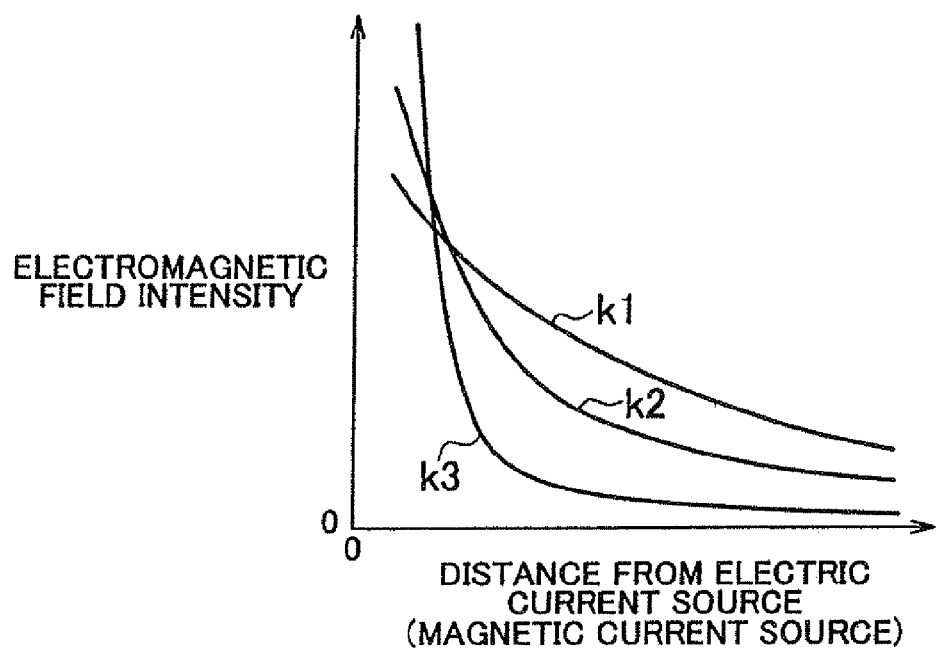
FIG. 3 is a diagram showing relations between the distance from the electric current source (magnetic current source) and the intensity of the electromagnetic field.

FIG. 3 is a diagram showing relations between the distance from the electric current source (magnetic current source) and the intensity of the electromagnetic field. Referring to FIG. 3, the electromagnetic field includes three components. The curve k1 represents a component that is inversely proportional to the distance from the electromagnetic wave source and is called "radiation field". The curve k2 represents a component that is inversely proportional to the square of the distance from the electromagnetic wave source and is called "induction field". The curve k3 represents a component that is inversely proportional to the cube of the distance from the electromagnetic wave source and is called "static field".

These components have the region, in which the intensity of the electromagnetic wave steeply decreases with the distance from the electromagnetic wave source, and this near field (evanescent field) is used to transmit the energy (electric power) in the resonance method. Specifically, with the use of the near field, by causing a pair of resonators (a pair of LC resonant coils, for example) having the same eigenfrequency to resonate with each other, energy (electric power) is transmitted from one resonator (primary self-resonant coil) to the other resonator (secondary self-resonant coil). Because the near field does not transmit energy (electric power) far away, the resonance method can transmit energy with lower energy loss as compared to the case where electromagnetic waves are used that transmit energy (electric power) with the use of the "radiation field" that transmits energy far away.

Figure 4:
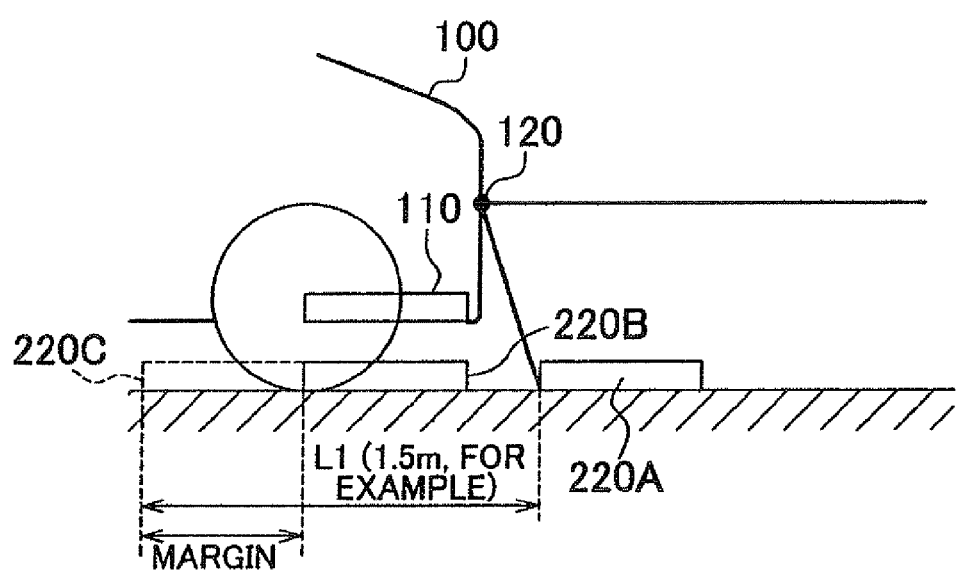
FIG. 4 is a diagram for explaining the problem that may arise when a vehicle is guided with the use of the camera 120 shown in FIG. 1.

FIG. 4 is a diagram for explaining the problem that may arise when the vehicle is guided using the camera 120 shown in FIG. 1.

Referring to FIG. 4, when the electric power transmitting unit 220 is at a position 220A, the electric power transmitting unit 220 is in the field of view of the camera 120 and the parking assist operation can be performed using the camera 120. However, when the electric power receiving unit 110 is installed in or on the bottom surface of the vehicle, it is necessary to move the vehicle 100 so that the electric power transmitting unit 220 comes to a position 220B. The vicinity of the position 22013 is in the blind spot of the camera 120 and therefore, the parking assist operation using the image captured by the camera 120 cannot be performed.

It is conceivable that the parking assist operation using the camera 120 is performed to some extent and the position is then estimated. However, this can cause a misalignment and there is a fear that the electric power transmission and reception cannot be performed well. In addition, there is a possibility that a front wheel treads on the electric power transmitting unit 220 or the vehicle contacts another obstacle when the vehicle excessively moves rearward.

For this reason, in this embodiment, after the electric power transmitting unit 220 becomes positioned in the blind spot of the camera 120, transmission and reception of weak electric power is performed between the electric power transmitting unit 220 and the electric power receiving unit 110 and based on the transmission and reception of the weak electric power, the parking assist operation is performed. This makes it possible to accurately indicate the parking position even after the electric power transmitting unit 220 becomes positioned under the vehicle as shown by the position 220B.

In order to prevent the vehicle 100 from moving excessively to cause a front wheel to tread on the electric power transmitting unit 220 or to cause the vehicle 100 to contact another obstacle, control is performed to stop the vehicle 100 when electric power is not received well by the electric power receiving unit 110 even after the vehicle 100 is moved so that the electric power transmitting unit 220 becomes positioned beyond the assumed range as shown by a position 220C. For example, the driver is warned to stop the vehicle 100 or the vehicle is automatically stopped when the position is not found, at which the electric power receiving unit 110 can receive the electric power in good condition, even after the vehicle 100 is moved by the distance L1 (1.5 m, for example) after part of the electric power transmitting unit 220 becomes positioned in the blind spot of the camera 120. The distance L1 is determined depending on the accuracy margin of the alignment conducted using the electric power receiving unit 110.

Figure 5:
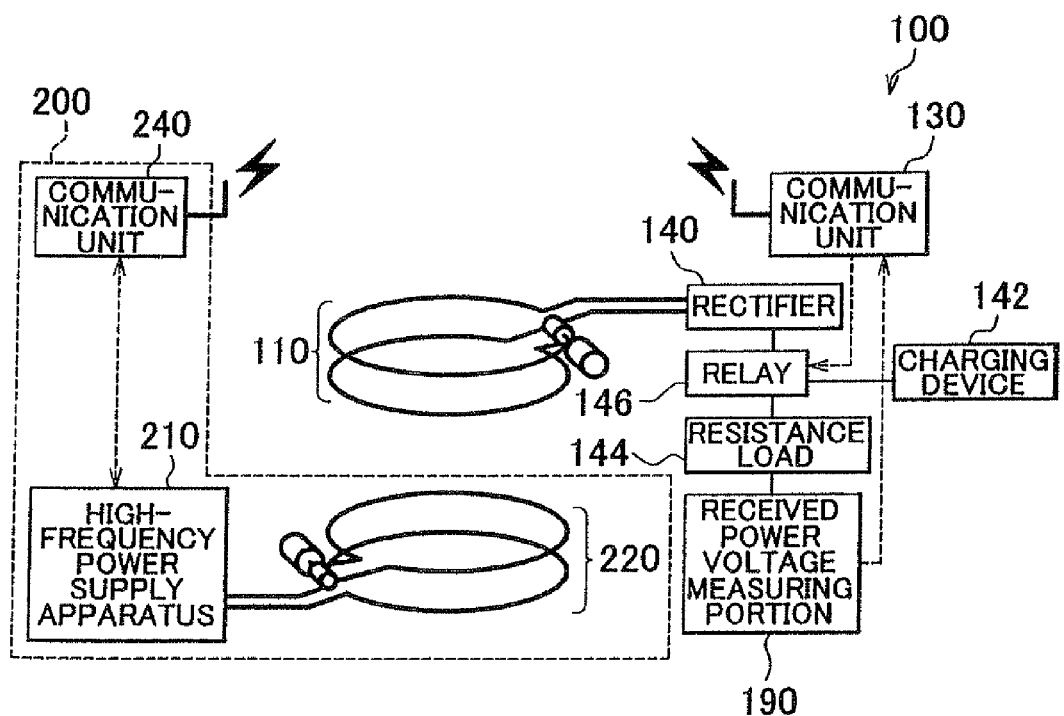
FIG. 5 is a diagram showing a schematic configuration related to power transmission and reception between the vehicle and a power supply apparatus shown in this embodiment.

FIG. 5 is a diagram showing a schematic configuration related to power transmission and reception between the vehicle and the power supply apparatus shown in this embodiment.

Referring to FIG. 5, the power supply apparatus 200 includes the electric power transmitting unit 220, the high-frequency power supply device 210, and the communication unit 240. The vehicle 100 includes the communication unit 130, the electric power receiving unit 110, a rectifier 140, a relay 146, a resistance load 144, a received power voltage measuring portion (voltage sensor) 190, and a charging device (DC/DC converter 142) for charging an electricity storage device (not shown).

The communication unit 240 and the communication unit 130 wirelessly communicate with each other to exchange information used for alignment of the electric power receiving unit 110 and the electric power transmitting unit 220. By temporarily connecting the resistance load 144 to the output of the electric power receiving unit 110 via the relay 146, the received power voltage measuring portion 190 is enabled to obtain the voltage information that is used to determine whether the conditions for receiving electric power are satisfied. The request to transmit weak electric power to obtain the voltage information is transmitted from the vehicle 100 to the power supply apparatus 200 via the communication units 130 and 240.

Figure 6:
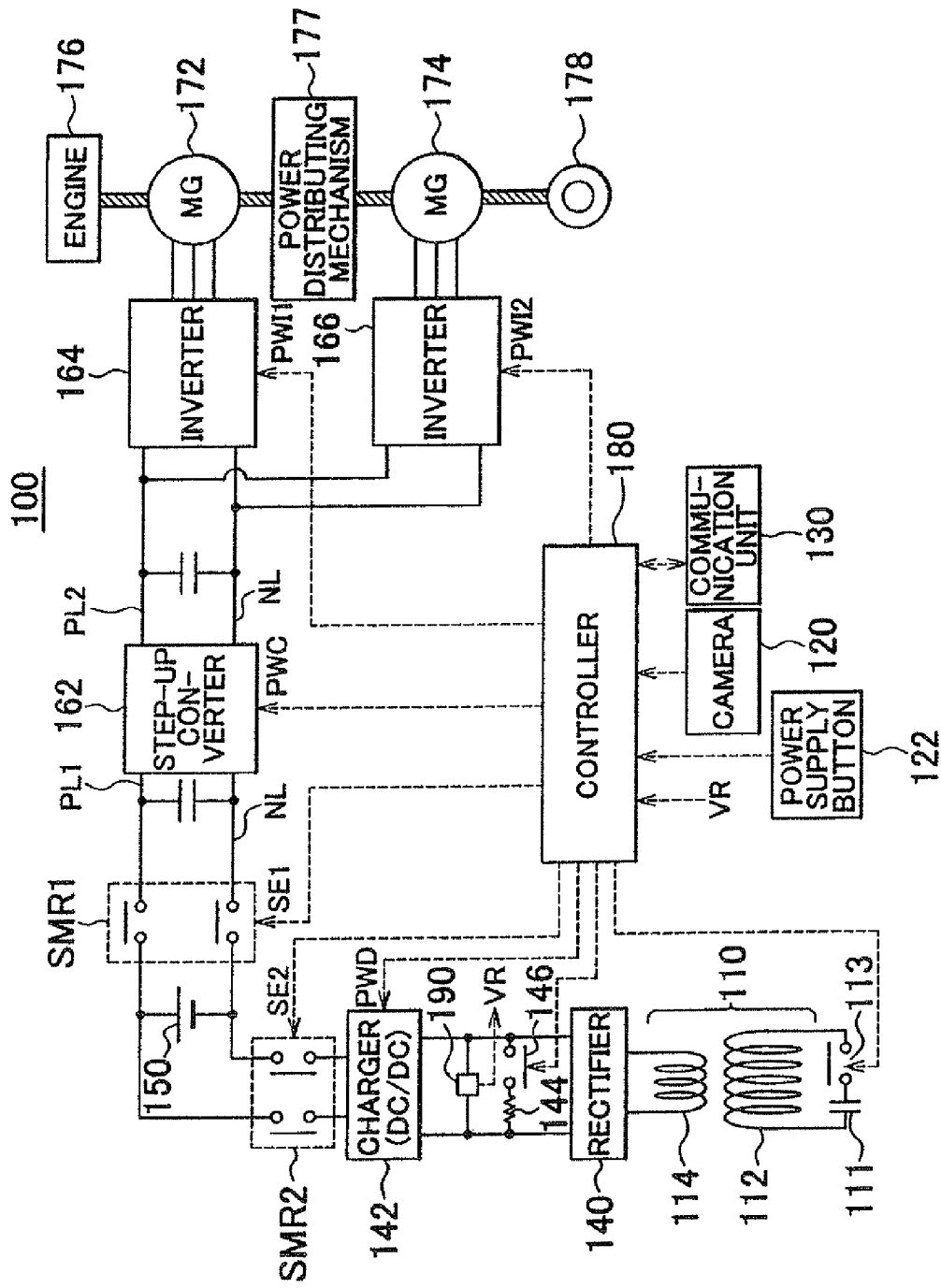
FIG. 6 is a configuration diagram showing details of the vehicle 100 shown in FIGS. 1 and 5.

FIG. 6 is a configuration diagram showing details of the vehicle 100 shown in FIGS. 1 and 5. Referring to FIG. 6, the vehicle 100 includes the electricity storage device 150, a system main relay SMR1, a step-up converter 162, inverters 164 and 166, motor generators 172 and 174, an engine 176, a power distributing mechanism 177, and a driving wheel 178.

The vehicle 100 further includes a secondary self-resonant coil 112, a secondary coil 114, the rectifier 140, the DC/DC converter 142, a system main relay SMR2, and the voltage sensor 190.

The vehicle 100 further includes a controller 180, the camera 120, the communication unit 130, and a power supply button 122.

The vehicle 100 is equipped with the engine 176 and the motor generator 174 as the motive power source. The engine 176 and the motor generators 172 and 174 are connected to the power distributing mechanism 177. The vehicle 100 is driven by the driving force generated by at least one of the engine 176 and the motor generator 174. The motive power generated by the engine 176 is distributed to two paths by the power distributing mechanism 177. Specifically, one path is the path of power transmission to the driving wheel 178 and the other path is the path of power transmission to the motor generator 172.

The motor generator 172 is an AC rotary electric machine and examples thereof include a three-phase AC synchronous motor, in which permanent magnets are embedded in the rotor. The motor generator 172 generates electric power with the use of the kinetic energy supplied from the engine 176 that is distributed by the power distributing mechanism 177. When the state of charge (SOC) of the electricity storage device 150 falls below a predetermined value, the engine 176 starts and the motor generator 172 generates electric power, thereby charging the electricity storage device 150.

The motor generator 174 is also an AC rotary electric machine and, as in the case of the motor generator 172, examples thereof include a three-phase AC synchronous motor, in which permanent magnets are embedded in the rotor. The motor generator 174 generates the driving force with the use of at least one of the electric power stored in the electricity storage device 150 and the electric power generated by the motor generator 172. The driving force generated by the motor generator 174 is transmitted to the driving wheel 178.

When the vehicle is braked or the acceleration thereof on a downslope is reduced, the mechanical energy stored in the vehicle in the form of the kinetic energy and the potential energy is used to rotate the motor generator 174 via the driving wheel 178 and the motor generator 174 functions as an electric generator. In this way, the motor generator 174 functions as a regenerative brake that generates a braking force by converting the mechanical energy to electric power. The electric power generated by the motor generator 174 is stored in the electricity storage device 150.

As the power distributing mechanism 177, a planetary gear including a sun gear, pinions, a carrier, and a ring gear can be used. The pinions engage with the sun gear and the ring gear. The carrier rotatably supports the pinions and is connected to the crankshaft of the engine 176. The sun gear is connected to the rotary shaft of the motor generator 172. The ring gear is connected to the rotary shaft of the motor generator 174 and the driving wheel 178.

The electricity storage device 150 is a rechargeable, direct-current (DC) power source and examples thereof include secondary batteries, such as lithium ion batteries and nickel hydrogen batteries. The electricity storage device 150 stores the electric power supplied from the DC/DC converter 142 and stores the electric power that is generated by the motor generators 172 and 174. The electricity storage device 150 supplies the stored electric power to the step-up converter 162. A large-capacitance capacitor can be used as the electricity storage device 150. The electricity storage device 150 is not limited as long as it functions as an electric power buffer that can temporarily store the electric power supplied from the power supply apparatus 200 (FIG. 1) and the electric power generated by the motor generators 172 and 174 and supply the stored electric power to the step-up converter 162.

The system main relay SMR1 is placed between the electricity storage device 150 and the step-up converter 162. When a signal SE1 from the controller 180 is activated, the system main relay SMR1 electrically connects the electricity storage device 150 to the step-up converter 162, and when the signal SE1 is deactivated, the system main relay SMR1 disconnects the electric line between the electricity storage device 150 and the step-up converter 162. The step-up converter 162 steps up the voltage of the positive line PL2 to a voltage equal to or higher than the voltage output from the electricity storage device 150, based on a signal PWC from the controller 180. Examples of the step-up converter 162 include a DC chopper circuit.

The inverters 164 and 166 are provided for the motor generators 172 and 174, respectively. The inverter 164 drives the motor generator 172 according to a signal PWI1 from the controller 180, and the inverter 166 drives the motor generator 174 according to a signal PWI2 from the controller 180. Examples of the inverters 164 and 166 include three-phase bridge circuits.

Both ends of the secondary self-resonant coil 112 are connected to a capacitor 111 with a switch (relay 113) placed therebetween, and when the switch (relay 113) is brought into conduction, the secondary self-resonant coil 112 resonates with the primary self-resonant coil of the power supply apparatus 200 via electromagnetic field. Electric power is received from the power supply apparatus 200 due to the resonance.

Although an example is shown in FIG. 6, in which the capacitor 111 is provided, adjustment in relation to the primary self-resonant coil may be made so that the resonance occurs due to the stray capacitance of the coil instead of the capacitor.

The number of turns of the secondary self-resonant coil 112 is appropriately set based on the distance between the secondary self-resonant coil 112 and the primary self-resonant coil of the power supply apparatus 200, the resonance frequency of the primary self-resonant coil and the secondary self-resonant coil 112, etc. so that the Q factor (Q>100, for example) that indicates the intensity of resonance of the primary self-resonant coil and the secondary self-resonant coil 112, kappa that indicates the degree of coupling therebetween, etc. become large.

The secondary coil 114 is disposed coaxially with the secondary self-resonant coil 112 and can be magnetically coupled to the secondary self-resonant coil 112 via electromagnetic induction. The secondary coil 114 receives, via electromagnetic induction, electric power received by the secondary self-resonant coil 112 to output the electric power to the rectifier 140. The secondary self-resonant coil 112 and the secondary coil 114 form the electric power receiving unit 110 shown in FIG. 1.

The rectifier 140 rectifies the AC power received by the secondary coil 114. Based on a signal PWD from the controller 180, the DC/DC converter 142 converts the electric power rectified by the rectifier 140 to a voltage level of the electricity storage device 150 and outputs the electric power to the electricity storage device 150.

The system main relay SMR2 is placed between the DC/DC converter 142 and the electricity storage device 150. When a signal SE2 from the controller 180 is activated, the system main relay SMR2 electrically connects the electricity storage device 150 to the DC/DC converter 142, and when the signal SE2 is deactivated, the system main relay SMR2 disconnects the electric line between the electricity storage device 150 and the DC/DC converter 142. The voltage sensor 190 detects the voltage VR between the rectifier 140 and the DC/DC converter 142 and outputs the detected value to the controller 180.

The resistor 144 and the relay 146 connected in series are placed between the rectifier 140 and the DC/DC converter 142. The relay 146 is controlled to be in conduction by the controller 180 when the vehicle position is adjusted to perform the non-contact power supply of the vehicle 100.

The controller 180 generates the signals PWC, PWI1, and PWI2 for driving the step-up converter 162, and the motor generators 172 and 174, respectively, based on the amount of operation of the accelerator, the vehicle speed, and signals from other various sensors. The controller 180 outputs the generated signals PWC, PWI1, and PWI2 to the step-up converter 162, and the inverters 164 and 166, respectively. When the vehicle is running, the controller 180 activates the signal SE1 to turn on the system main relay SMR1, and deactivates the signal SE2 to turn off the system main relay SMR2.

When electric power is supplied from the power supply apparatus 200 (FIG. 1) to the vehicle 100, the controller 180 receives the image captured by the camera 120 from the camera 120. In addition, the controller 180 receives, from the power supply apparatus 200, the information on the electric power (voltage and current) output from the power supply apparatus 200 via the communication unit 130 and receives, from the voltage sensor 190, the detected value of the voltage VR that is detected by the voltage sensor 190. The controller 180 performs parking control of the vehicle by the method to be described later so that the vehicle is guided to the electric power transmitting unit 220 (FIG. 1) of the power supply apparatus 200, based on these data.

When the parking control for guidance to the electric power transmitting unit 220 is completed, the controller 180 sends, to the power supply apparatus 200, an instruction to supply electric power via the communication unit 130 and activates the signal SE2 to turn on the system main relay SMR2. The controller 180 then generates the signal PWD for driving the DC/DC converter 142 and outputs the generated signal PWD to the DC/DC converter 142.

Figure 7:
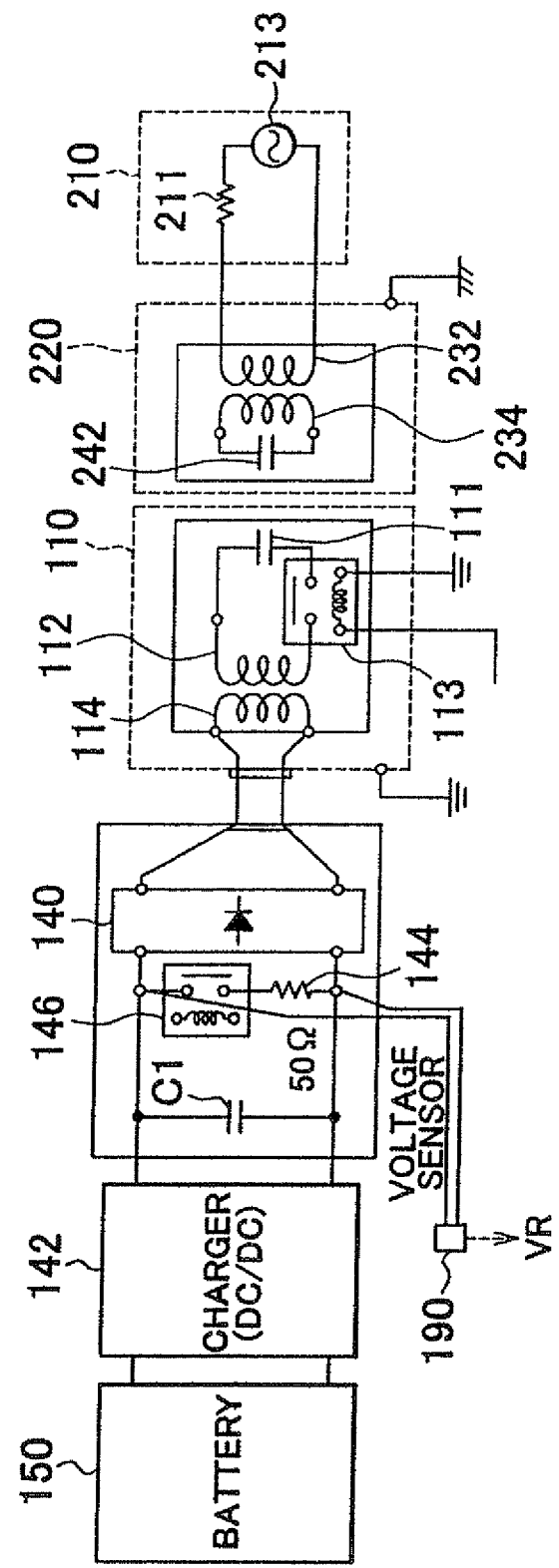
FIG. 7 is a circuit diagram for explaining an electric power receiving unit 110 on the vehicle side and an electric power transmitting unit 220 on the power supply apparatus side in more detail.

FIG. 7 is a circuit diagram for explaining the electric power receiving unit 110 on the vehicle side and the electric power transmitting unit 220 on the power supply apparatus side in more detail.

Referring to FIG. 7, the high-frequency power supply device 210 is represented by a high-frequency AC power supply 213 and a resistor 211 representing the impedance of the power supply.

The electric power transmitting unit 220 includes a primary coil 232 connected to the high-frequency power supply device 210, a primary self-resonant coil 234 that is magnetically coupled to the primary coil 232 via electromagnetic induction, and a capacitor 242 connected across the primary self-resonant coil 234.

The electric power receiving unit 110 includes the secondary self-resonant coil 112 that resonates with the primary self-resonant coil 234 via electromagnetic field, and the capacitor 111 and the relay 113 that are connected in series across the secondary self-resonant coil 112. The relay 113 is controlled to be in conduction when electric power is received.

The electric power receiving unit 110 further includes the secondary coil 114 that is magnetically coupled to the secondary self-resonant coil 112. The AC power received by the secondary coil 114 is rectified by the rectifier 140. The capacitor C1 is connected to the output of the rectifier 140, and the relay 146 and the resistor 144 that are used when the relative position between the vehicle and the power supply facility is adjusted are connected between the terminals of the capacitor C1. A charging device (DC/DC converter 142) is further connected on the output side of the rectifier 140 to convert the voltage to an appropriate charging voltage, and the converted charging voltage is supplied to the battery (electricity storage device 150).

The resistor 144 is set to have an impedance of 50 ohms, for example, and this value is adjusted to be matched to the impedance represented by the resistor 211 of the high-frequency power supply device 210.

When the vehicle stop position is adjusted to perform the non-contact power supply of the vehicle, the voltage sensor 190 detects the voltage across the resistor 144 and outputs the detected value VR to the controller 180.

On the other hand, when the adjustment of the vehicle position is completed and the vehicle is being charged from an external power source by the non-contact power supply, the voltage sensor 190 detects, as the detected value VR, the voltage input to the DC/DC converter 142.

Figure 8:
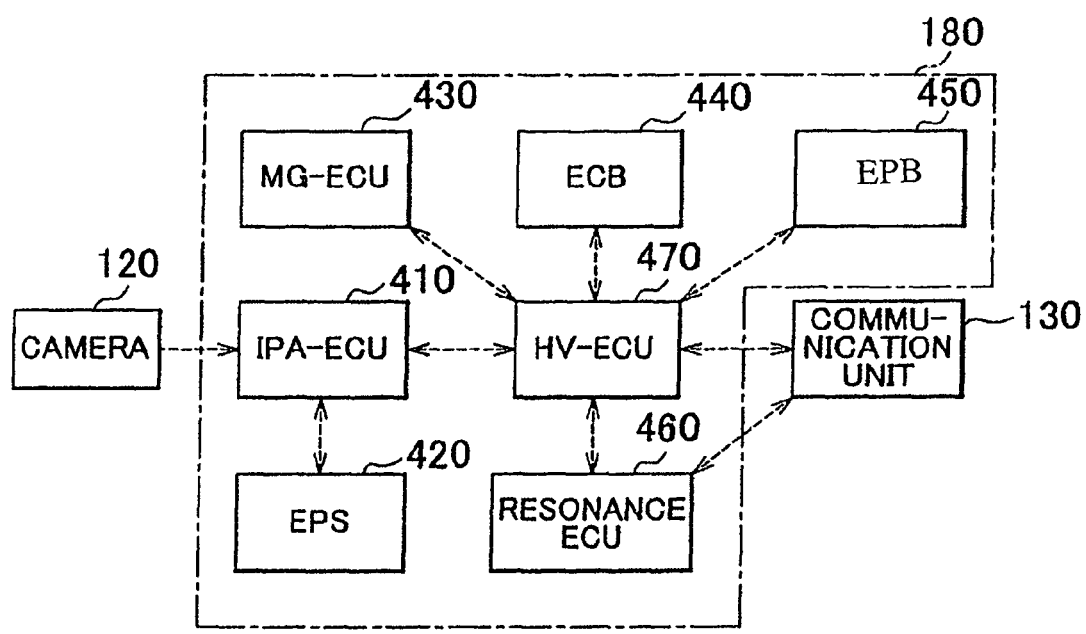
FIG. 8 is a functional block diagram of a controller 180 shown in FIG. 6.

FIG. 8 is a functional block diagram of the controller 180 shown in FIG. 6. Referring to FIG. 8, the controller 180 includes an intelligent parking assist (IPA)-electronic control unit (ECU) 410, an electric power steering (EPS) 420, a motor generator (MG)-ECU 430, an electronically controlled brake (ECB) 440, an electric parking brake (EPB) 450, a resonance ECU 460, and a hybrid vehicle (HV)-ECU 470.

The IPA-ECU 410 performs guiding control to guide the vehicle to the electric power transmitting unit 220 (FIG. 1) of the power supply apparatus 200 based on the image information received from the camera 120 when the operation mode of the vehicle is the charging mode (first guiding control).

Specifically, the IPA-ECU 410 recognizes the electric power transmitting unit 220 based on the image information received from the camera 120. The electric power transmitting unit 220 is provided with the plurality of luminous portions 230 that show the position and orientation of the electric power transmitting unit 220. The WA-ECU 410 recognizes the positional relation between the vehicle and the electric power transmitting unit 220 (roughly estimated distance and orientation) based on the image of the plurality of luminous portions 230 captured by the camera 120. Based on the result of recognition, the WA-ECU 410 outputs an instruction to the EPS 420 so as to guide the vehicle to the electric power transmitting unit 220 in a proper direction.

The IPA-ECU 410 provides, to the HV-ECU 470, the notification of end of the guiding control (first guiding control) based on the image information received from the camera 120 when the vehicle approaches the electric power transmitting unit 220 to cause the electric power transmitting unit 220 to be positioned under the vehicle body and it becomes impossible for the camera 120 to capture the electric power transmitting unit 220. The EPS 420 performs automatic control of the steering according to the instructions sent from the IPA-ECU 410 during the first guiding control.

The MG-ECU 430 controls the motor generators 172 and 174, and the step-up converter 162 according to the instructions sent from the HV-ECU 470. Specifically, the MG-ECU 430 generates signals for driving the motor generators 172 and 174 and the step-up converter 162 and outputs the signals to the inverters 164 and 166 and the step-up converter 162.

The ECB 440 controls braking of the vehicle according to the instructions sent from the HV-ECU 470. Specifically, the ECB 440 controls the hydraulic brake according to the instructions sent from the HV-ECU 470, and performs cooperative control of the hydraulic brake and the regenerative brake using the motor generator 174. The EPB 450 controls the electric parking brake according to the instructions sent from the HV-ECU 470.

The resonance ECU 460 receives, from the power supply apparatus 200, information on the electric power output from the power supply apparatus 200 (FIG. 1) via the communication unit 130. The resonance ECU 460 receives, from the voltage sensor 190 (FIGS. 6 and 7), the detected value of the voltage VR indicating the voltage of the electric power received by the vehicle. The resonance ECU 460 detects the distance between the electric power transmitting unit 220 of the power supply apparatus 200 and the electric power receiving unit 110 of the vehicle by, for example, comparing the voltage VR and the voltage transmitted from the power supply apparatus 200. The resonance ECU 460 then executes a second vehicle guiding process of guiding the vehicle 100 based on the detected distance.

The HV-ECU 470 moves the vehicle 100 by controlling the MG-ECU 430 for driving the vehicle based on the result of one of the first vehicle guiding process and the second vehicle guiding process. The HV-ECU 470 executes a process of stopping the vehicle 100 when the electric power received by the electric power receiving unit 110 from the electric power transmitting unit 220 does not satisfy a predetermined electric power reception condition, based on which it is determined whether it is possible to start receiving electric power, even after the vehicle has been moved by the MG-ECU 430 beyond a predetermined distance after the IPA-ECU 410 becomes unable to detect the position of the electric power transmitting unit 220 based on the image. This process may be a process of automatically applying a brake or may be a process of instructing the driver to depress a brake pedal.

The HV-ECU 470 stops the reception of electric power via the electric power receiving unit 110 and discontinues the guide performed by the resonance ECU 460 when the electric power received by the electric power receiving unit 110 from the electric power transmitting unit 220 does not satisfy a predetermined electric power reception condition, based on which it is determined whether it is possible to start receiving electric power, even after the vehicle has been moved by the MG-ECU 430 beyond the predetermined distance after the IPA-ECU 410 becomes unable to detect the position of the electric power transmitting unit 220 based on the image.

The HV-ECU 470 ends the guide performed by the resonance ECU 460 and starts preparing for charging the electricity storage device 150 on the vehicle via the electric power transmitting unit 220 when the electric power received by the electric power receiving unit 110 from the electric power transmitting unit 220 satisfies the electric power reception condition before the vehicle has been moved the predetermined distance after the IPA-ECU 410 becomes unable to detect the position of the electric power transmitting unit 220 based on the image.

It is more preferable that after automatically stopping the vehicle 100 and discontinuing the guide performed by the resonance ECU 460, the HV-ECU 470 restart transmitting or receiving the electric power via the electric power receiving unit 110 in response to the instruction (operation to set the shift lever to the parking range) from the driver after the driver changes the vehicle position. Then, the HV-ECU 470 starts charging the electricity storage device 150 on the vehicle via the electric power transmitting unit 220 when the electric power received by the electric power receiving unit 110 from the electric power transmitting unit 220 satisfies the electric power reception condition and on the other hand, the HV-ECU 470 warns the driver when the electric power received by the electric power receiving unit 110 from the electric power transmitting unit 220 does not satisfy the electric power reception condition.

Figure 9:
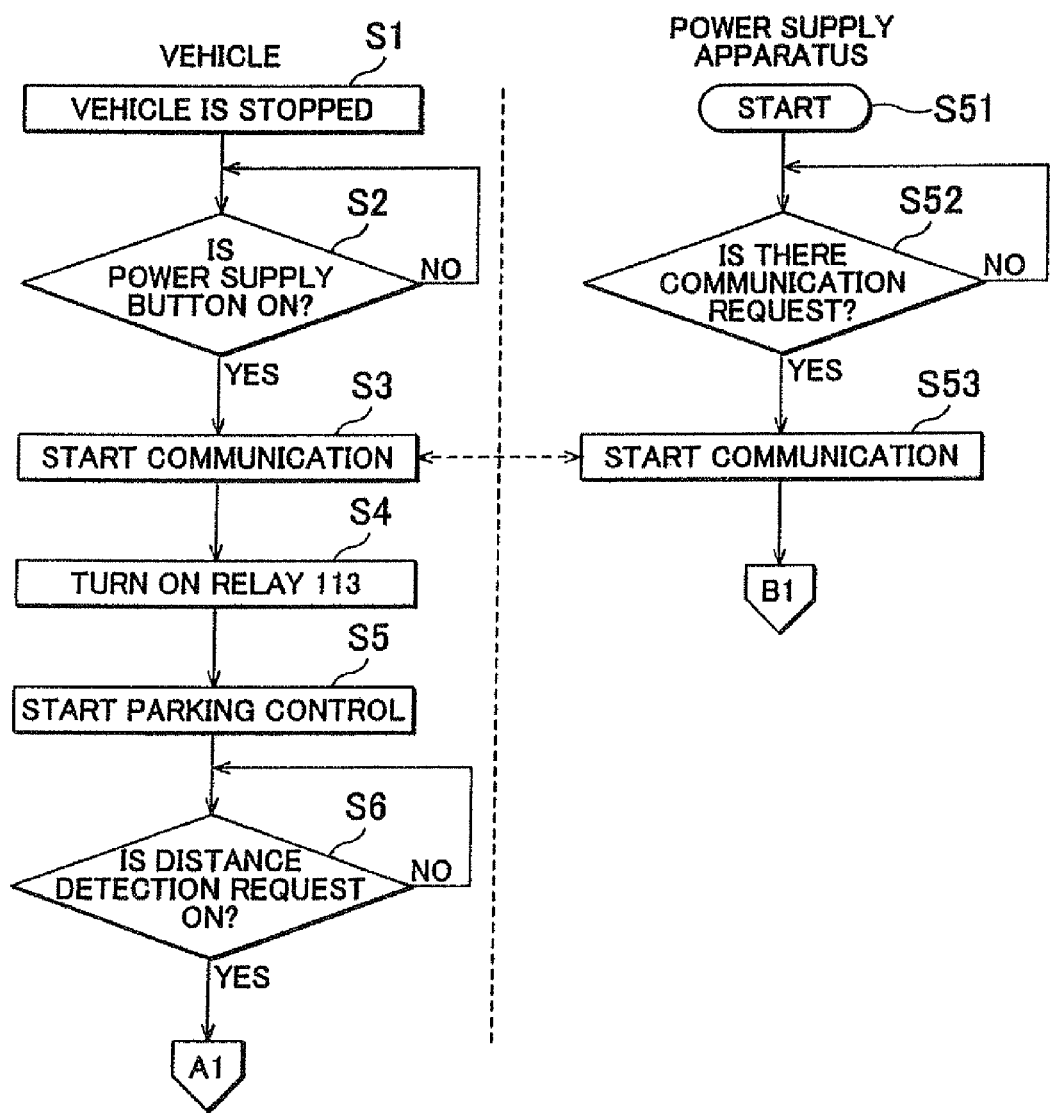
FIG. 9 is a flow chart (the first half) for explaining control performed in a step of adjusting a vehicle position when a non-contact power supply is performed.

FIG. 9 is a flow chart (the first half) for explaining the control performed in the step of adjusting the vehicle position when the non-contact power supply is performed.

Figure 10A:
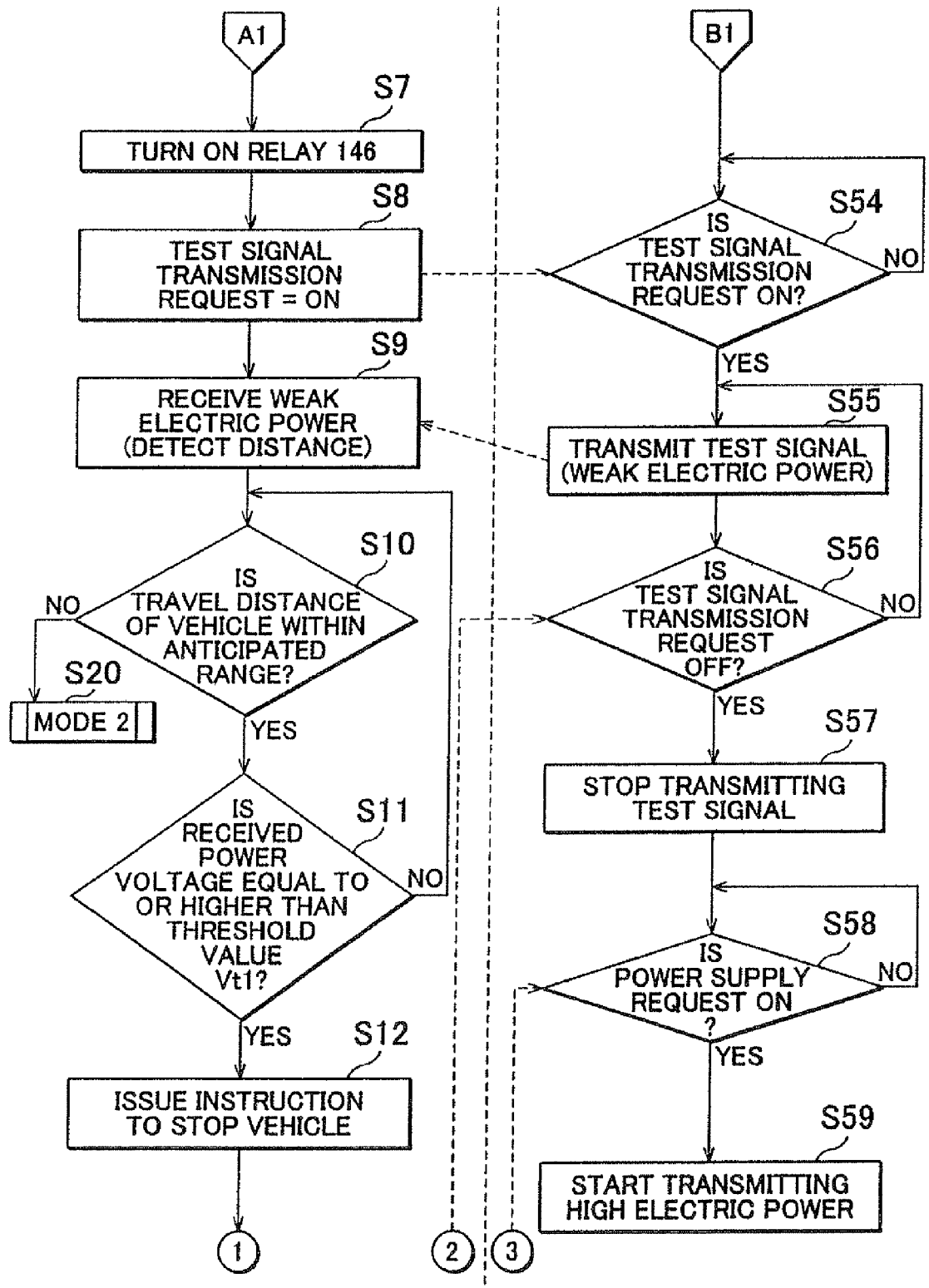
FIGS. 10A and 10B show a flow chart (the second half) for explaining the control performed in the step of adjusting the vehicle position when the non-contact power supply is performed.
Figure 10B:
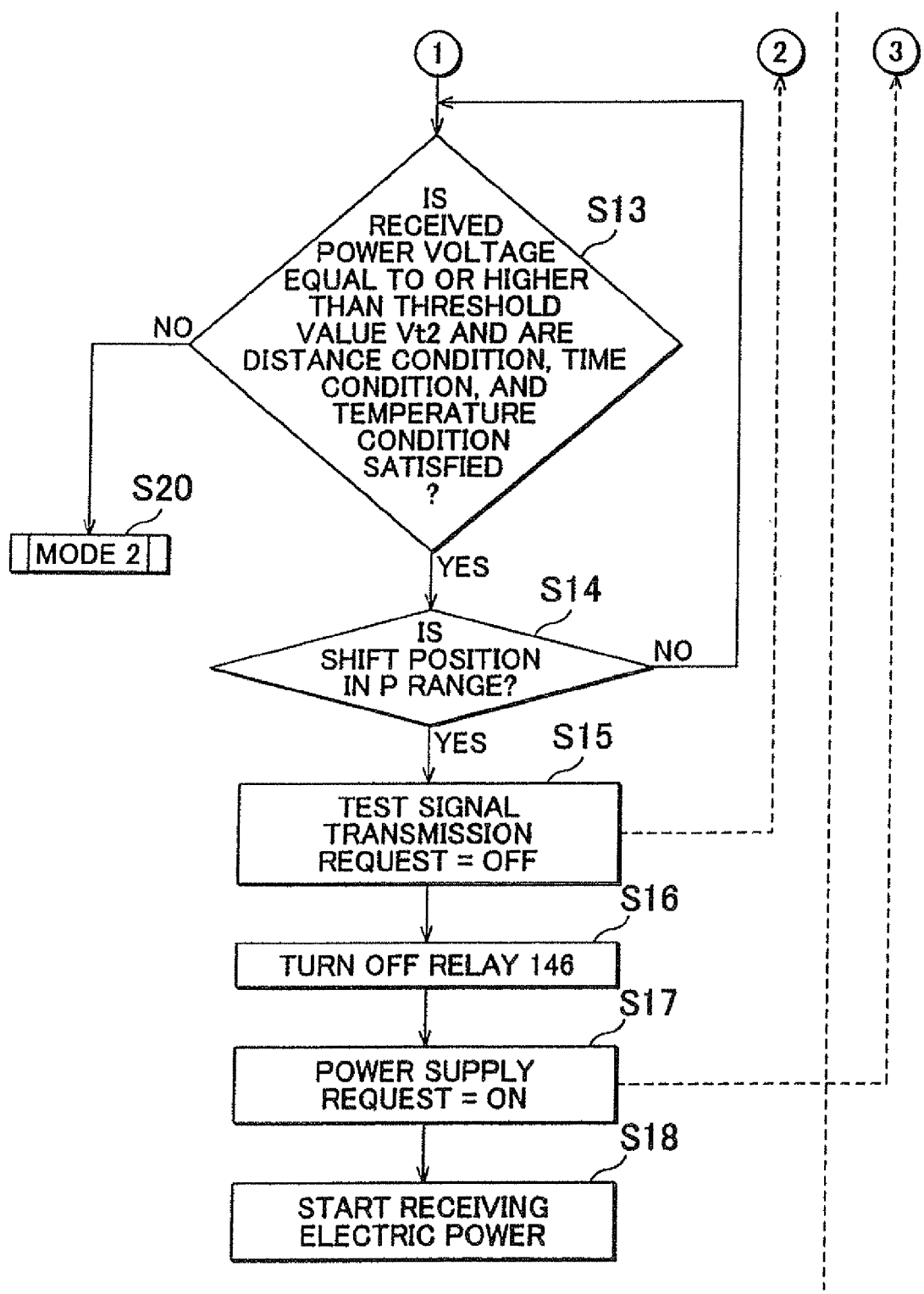

FIGS. 10A and 10B show a flow chart (the second half) for explaining the control performed in the step of adjusting the vehicle position when the non-contact power supply is performed.

In the left side part of each of FIGS. 9, 10A, and 10B, the control performed on the vehicle side is shown and in the right side part thereof, the control performed on the power supply apparatus side is shown.

Referring to FIGS. 1 and 9, a vehicle stopping process is performed in step S1 on the vehicle side and subsequently, in step S2, it is detected whether the power supply button 122 is brought into an on state. When the power supply button is not brought into the on state, the controller 180 waits until the power supply button is brought into the on state. When it is detected that the power supply button 122 is brought into the on state in step S2, the process proceeds to step S3. In step S3, the controller 180 starts communicating with the power supply apparatus 200 with the use of the communication unit 130.

On the power supply apparatus side, once the process starts in step S51, the process waits in step S52 until there is a communication request from the vehicle side, and when there is a request to start communication, communication is started in step S53.

On the vehicle side, control to bring the relay 113 into an on state is performed in step S4 subsequently to the process of starting communication in step S3. Then, in step S5, the parking control is started. In the first step of the parking control, an intelligent parking assist (IPA) system using a camera is used.

When the vehicle approaches the power supply position to a certain extent, a distance detection request is set to an on state in the controller 180 (YES in step S6).

Referring to FIGS. 1 and 10A and 10B, on the power supply apparatus side, subsequent to step S53, the process waits until the test signal transmission request is set to an on state in step S54.

On the other hand, on the vehicle side, the process proceeds from step S6 to step S7 and the controller 180 brings the relay 146 into an on state. In step S8, the notification that the test signal transmission request is brought into the on state is transmitted to the power supply apparatus side. The power supply apparatus then detects that the test signal transmission request is brought into the on state in step S54 and advances the process to step S55 to send a test signal to the vehicle. Although the test signal may have the same electric power as that sent after charging is started, it is preferable that the test signal be set to be a weak signal (weak electric power) that is weaker than the signal sent when the main power supply operation is performed.

The arrival of the vehicle in the area, in which electric power can be supplied, is detected based on the fact that the voltage across the resistor 144 caused by the test signal reaches a certain voltage.

While the primary side voltage (voltage output from the power supply apparatus 200) is constant, the secondary side voltage (voltage received by the vehicle 100) varies depending on the distance L between the electric power transmitting unit 220 of the power supply apparatus 200 and the electric power receiving unit 110 of the vehicle 100. Thus, it is possible to prepare a map, or the like, by measuring the relations between the primary side voltage and the secondary side voltage in advance, for example, to detect the distance between the electric power transmitting unit 220 and the electric power receiving unit 110 based on the detected value of the voltage VR indicating the secondary side voltage.

Note that the primary side current (electric current output from the power supply apparatus 200) also varies depending on the distance L between the electric power transmitting unit 220 and the electric power receiving unit 110 and therefore, the distance between the electric power transmitting unit 220 and the electric power receiving unit 110 may be detected based on the detected value of the electric current output from the power supply apparatus 200 with the use of this relation.

When the resonance ECU 460 detects the distance between the electric power transmitting unit 220 and the electric power receiving unit 110, the resonance ECU 460 outputs the distance information to the HV-ECU 470. When the resonance ECU 460 receives the instruction to start charging from the HV-ECU 470, the resonance ECU 460 turns on the system main relay SMR2 by activating the signal SE2 that is output to the system main relay SMR2. The resonance ECU 460 then generates the signal for driving the DC/DC converter 142 and outputs the generated signal to the DC/DC converter 142.

The HV-ECU 470 outputs control instructions to the MG-ECU 430 and the BCE 440 according to the status of operation of the accelerator pedal and/or the brake pedal, the drive status of the vehicle, etc. when the operation mode of the vehicle is the driving mode. When the driver provides the instruction to activate the parking brake by, for example, operating a parking brake switch, the HV-ECU 470 outputs an instruction to operate to the EPB 450.

On the other hand, when the operation mode of the vehicle is the charging mode, the HV-ECU 470 establishes communication with the power supply apparatus 200 (FIG. 1) via the communication unit 130 and outputs an activation instruction to activate the power supply apparatus 200 to the power supply apparatus 200 via the communication unit 130. When the power supply apparatus 200 is activated, the HV-ECU 470 outputs an instruction to turn on the luminous portions 230 provided on the electric power transmitting unit 220 of the power supply apparatus 200 to the power supply apparatus 200 via the communication unit 130. When the luminous portions 230 are turned on, the HV-ECU 470 outputs, to the power supply apparatus 200 via the communication unit 130, a guiding control indication signal indicating that the guiding control to guide the vehicle 100 to the electric power transmitting unit 220 is being performed, and in addition, the HV-ECU 470 outputs, to the IPA-ECU 410, an instruction to perform a guiding control (first guiding control) using the image information provided from the camera 120.

In addition, when the HV-ECU 470 receives a notice of end of the first guiding control from the IPA-ECU 410, the HV-ECU 470 performs a guiding control (second guiding control) using the information on the distance between the electric power transmitting unit 220 and the electric power receiving unit 110. Specifically, the HV-ECU 470 receives the information on the distance between the electric power transmitting unit 220 of the power supply apparatus 200 and the electric power receiving unit 110 of the vehicle from the resonance ECU 460, and based on the distance information, the HV-ECU 470 outputs instructions to the MG-ECU 430 and the ECB 440 that control driving and braking, respectively, of the vehicle so that the distance between the electric power transmitting unit 220 and the electric power receiving unit 110 is minimized.

In steps S10 and S11 in FIG. 10A, it is determined whether to end the parking operation. Specifically, in step S10, it is determined whether the travel distance of the vehicle is within an anticipated range. The travel distance of the vehicle herein is calculated from the product of the vehicle speed and the elapsed time.

When it is determined in step S10 that the travel distance of the vehicle is beyond the anticipated range, the process proceeds to step S20 (operation mode 2). The anticipated range may be 1.5 m, for example, after the electric power transmitting unit 220 becomes positioned in the blind spot of the camera 120 as described using FIG. 4. Since the accuracy of the vehicle speed sensor is not high at low vehicle speeds, it is necessary to select a threshold value that determines the anticipated range, in consideration of the detection error of the vehicle speed sensor.

When it is determined in step S10 that the travel distance of the vehicle is not beyond the anticipated range, the process proceeds to step S11 and it is determined whether the voltage detected by the voltage sensor 190 is equal to or higher than the threshold value Vt1.

Figure 11:
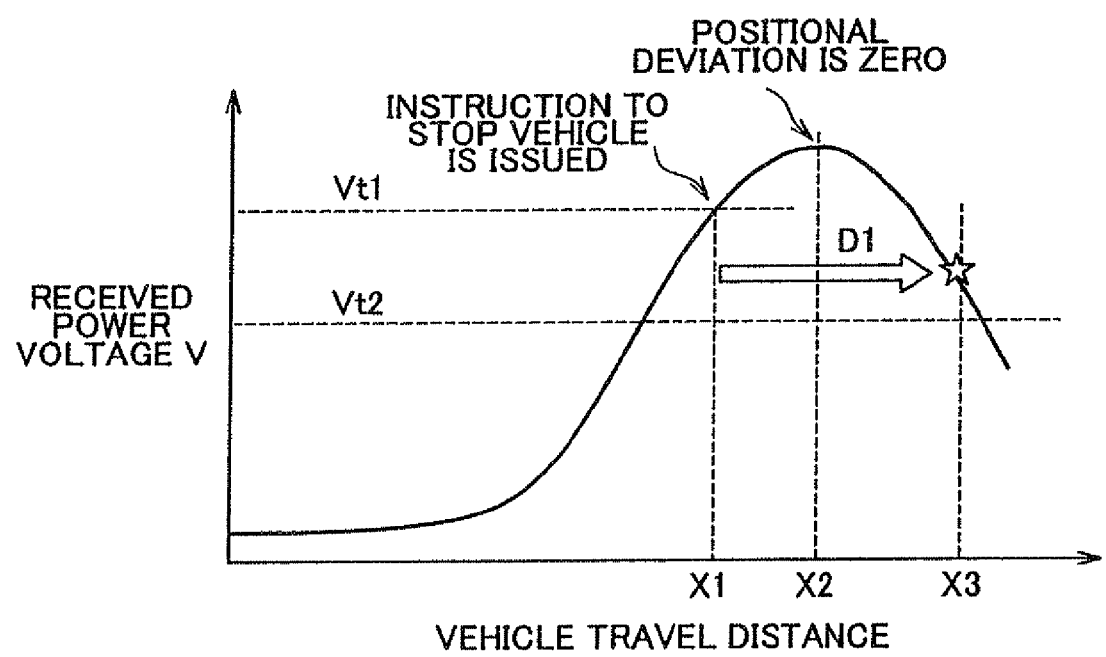
FIG. 11 is a diagram showing a relation between the vehicle travel distance and the received power voltage.

FIG. 11 is a diagram showing a relation between the vehicle travel distance and the received power voltage. As shown in FIG. 11, the received power voltage V increases as the vehicle travel distance approaches the point, at which the positional deviation is zero. When the position, at which the positional deviation is zero, is passed, the received power voltage V starts decreasing. The threshold value VU is a determination threshold value, based on which the instruction to stop is output to the vehicle, and the threshold value Vt1 is determined by measuring the relation between the distance between the electric power transmitting unit 220 and the electric power receiving unit 110 and the voltage in advance.

On the other hand, the threshold value Vt2 shown in FIG. 11 is a threshold value determined based on the allowable leaking electromagnetic field intensity that is an intensity of the electromagnetic field that leaks when the power transmission and reception at the maximum power output is performed, and the threshold value Vt2 is smaller than the threshold value Vt1.

Referring again to FIG. 10A, when the received power voltage is not equal to or higher than the threshold value Vt1 in step S11, the process returns to step S10. The controller 180 repeatedly determines whether the electric power receiving coil (secondary self-resonant coil 112) is positioned, relative to the electric power transmitting coil (primary self-resonant coil 234), so as to be able to receive the electric power from the electric power transmitting coil, and during this, the controller 180 determines the direction of travel of the vehicle so that the electric power receiving coil, is positioned, relative to the electric power transmitting coil, so as to be able to receive the electric power from the electric power transmitting coil.

Figure 12:
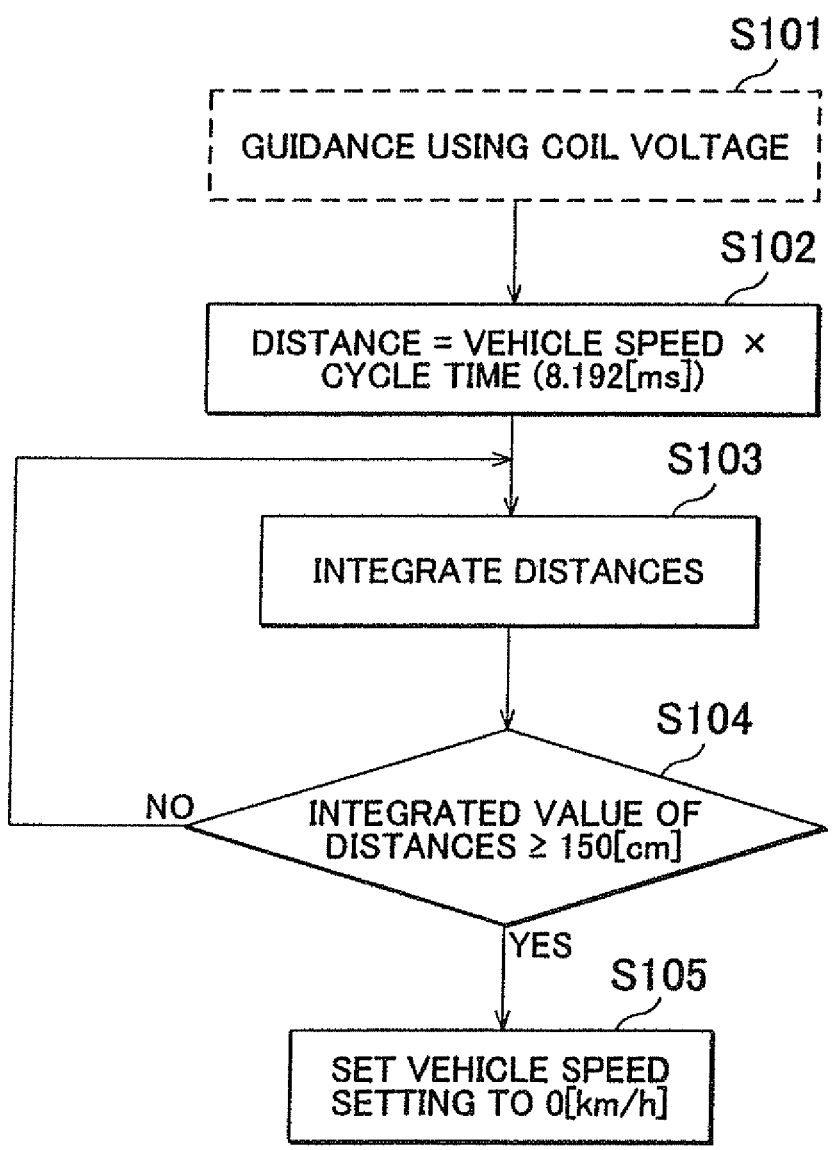
FIG. 12 is a flow chart for explaining the detection of travel distance of the vehicle performed in step S10 of FIG. 10A.

The calculation of the travel distance of the vehicle performed in step S10 will now be described in detail. FIG. 12 is a flow chart for explaining the detection of the travel distance of the vehicle performed in step S10 of FIG. 10A.

Referring to FIG. 12, when the guide using the coil voltage VR is started at step S101, setting is made so that the increment of the distance is calculated using the product of the vehicle speed and the cycle time (8.192 ms, for example) independently of the detection of the position using the coil voltage VR, as shown by step S102. The vehicle speed is detected by the vehicle speed sensor.

The distances are integrated in step S103 and it is determined in step S104 whether or not the integrated value of the distances is equal to or greater than a threshold value (150 cm, for example). When the integrated value has not reached the threshold value yet in step S104, the process returns to step S103 and integrating the distances is continued. In this case, the parking operation with the parking assist operation is continued.

When the integrated value of the distances is equal to or greater than 150 cm in step S104, the vehicle speed setting is set to 0 km/h in order to prevent the over travel as described with reference to FIG. 4.

Figure 13:
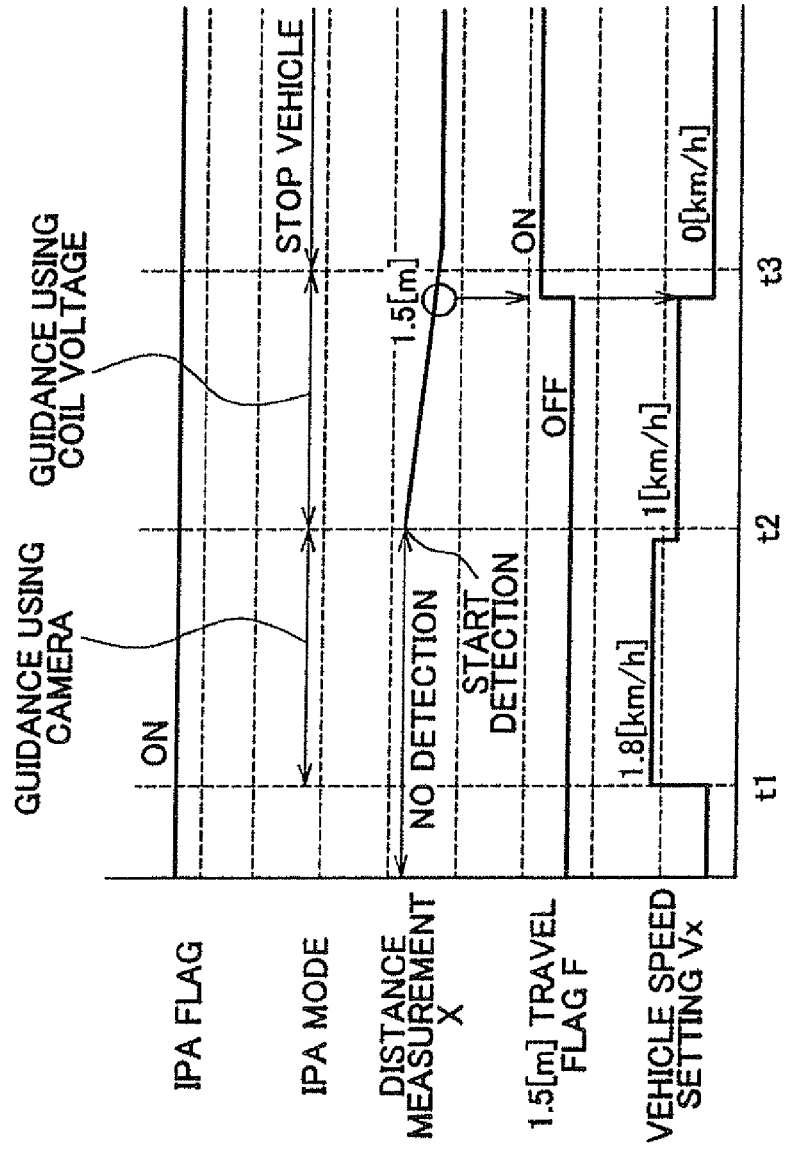
FIG. 13 is an operation waveform diagram showing an example of the operation, in which the vehicle speed setting is set to zero according to the flow chart shown in FIG. 12.

FIG. 13 is an operation waveform diagram showing an example of the operation, in which the vehicle speed setting is set to zero according to the flow chart shown in FIG. 12.

Referring to FIG. 13, at time t1, the IPA flag is set to ON and the vehicle speed setting is set to 1.8 km/h. The IPA flag is brought to an ON state when the driver selects an intelligent parking assist mode. From t1 to t2, the IPA mode (parking assist mode) is the guiding mode, in which the guide is performed using the camera 120. When the electric power transmitting unit 220 becomes positioned in the blind spot of the camera 120 at time t2, the IPA mode is changed to the guiding mode, in which the guide is performed using the coil voltage, at time t2. When the distance reaches the threshold value, that is, 1.5 m, in steps S103 and S104 of FIG. 12, the flag F is changed from OFF to ON at time t3, so that the vehicle speed setting is set to 0 km/h and the vehicle is stopped.

Referring again to FIGS. 10A and 10B, when the received power voltage is equal to or higher than the threshold value Vt1 in step S11, the controller 180 outputs the instruction to stop the vehicle in step S12. The instruction to stop the vehicle may be an instruction to prompt the driver to stop the vehicle by depressing the brake pedal or may be an instruction to perform a process of automatically applying the brake. However, there is a possibility that the vehicle moves after the instruction to stop the vehicle is issued as shown by the arrow D1 in FIG. 11 and therefore, when, after the vehicle is stopped, the received power voltage is equal to or higher than the threshold value Vt2 in step S13, the travel distance of the vehicle is within the anticipated range, the elapsed time does not exceed the time limit, and the temperature is an appropriate temperature to perform charging, the process proceeds to step S14. When one of the conditions is not satisfied in step S13, the process proceeds to step S20 (mode 2).

In step S14, it is determined whether the shift position is brought into the P range. In step S14, when the shift position is not in the P range, the process of step S13 is repeatedly performed until the shift position is brought into the P range, and the monitoring of the misalignment of the vehicle is continued.

In step S14, when the shift position is brought into the P range, the process proceeds to step S15. In this case, it is determined that the position, at which the vehicle is stopped, is settled and that the parking operation is completed, and the controller 180 of the vehicle sets the test signal transmission request to an OFF state. Specifically, the change of the shift position into the P range triggers the stop of transmission of the weak electric power (test signal).

When the power supply apparatus is notified of the setting via communication, it is detected in step S56 that the test signal transmission request is changed to the OFF state and the transmission of the test signal is stopped in step S57.

In the power supply apparatus, subsequently, it is detected in step S58 whether the power supply request is brought into an ON state.

On the vehicle side, the process proceeds to S16 after the test signal transmission request is set to the OFF state in step S15.

In step S16, the relay 146 is controlled to switch from the ON state to the OFF state. Thereafter, the HV-ECU 470 outputs, to the power supply apparatus 200 via the communication unit 130, the instruction to start supplying electric power from the power supply apparatus 200, and the HV-ECU 470 outputs the instruction to start charging to the resonance ECU 460. In step S17, the HV-ECU 470 notifies the power supply apparatus of the fact that the power supply request is brought into an ON sate, via communication.

On the power supply apparatus side, it is detected that the power supply request is brought into the ON state in step S58 and supplying high electric power is started in step S59. Thus, on the vehicle side, receiving the electric power is started in step S18.

Figure 14:
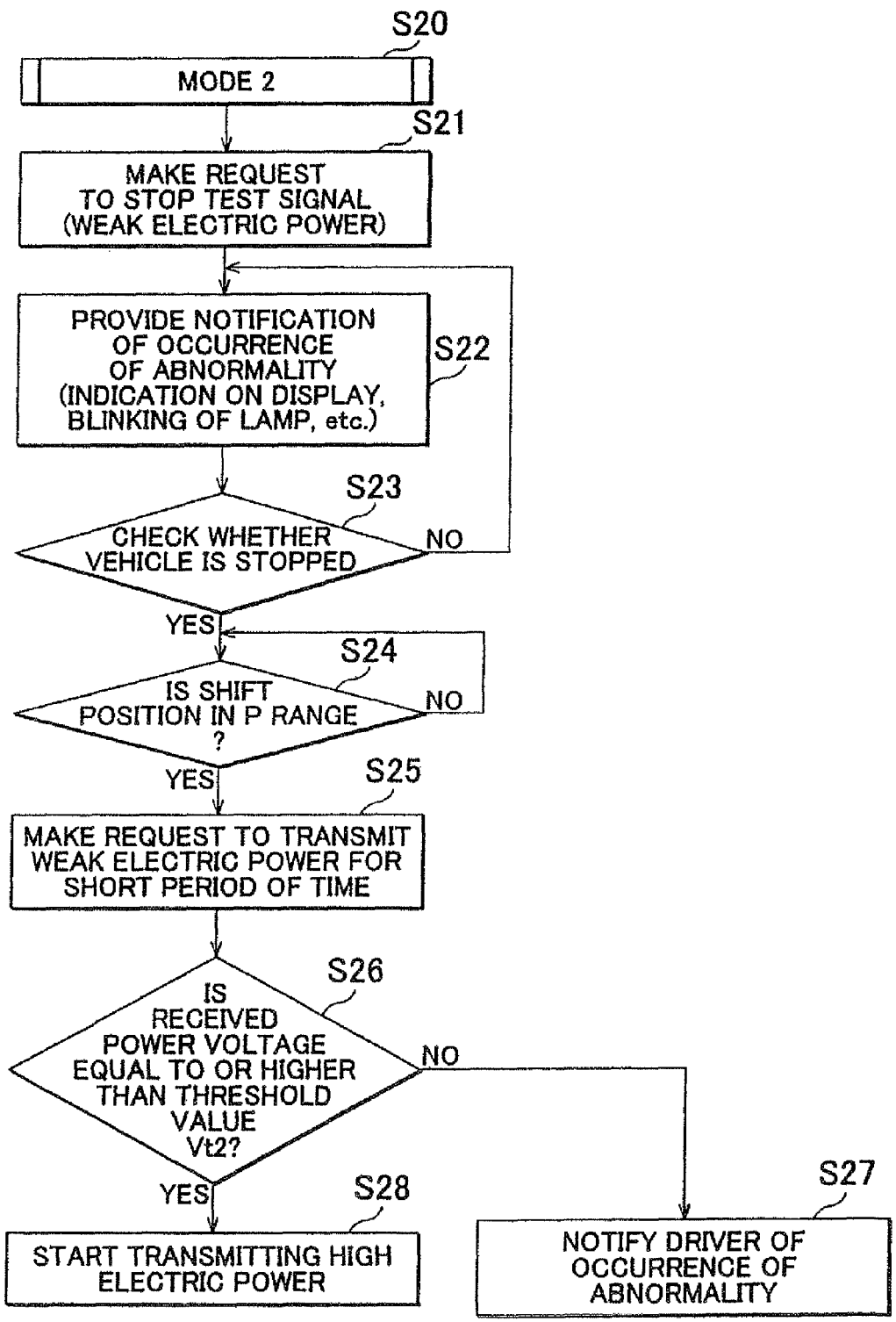
FIG. 14 is a flow chart for explaining a process of operation mode 2 executed in step S20 of FIGS. 10A and 10B.

FIG. 14 is a flow chart for explaining the process of the operation mode 2 executed in step S20 of FIGS. 10A and 10B. The operation mode 2 is a mode that is selected when the distance detection to be performed using the coil at a weak electric power is not performed and the driver retries the parking operation.

Referring to FIG. 14, when the process of the operation mode 2 is started at step S20, it is requested to stop the test signal (weak electric power) in step S21. In step S22, the driver is provided with, via the indication on a display, blinking of a lamp, etc., the notification of the occurrence of the abnormality that it does not become possible to receive electric power even after the anticipated range is passed. In response to this, the driver conducts a manual adjustment of the vehicle position.

In step S23, it is determined whether the vehicle is stopped. If it is not confirmed that the vehicle is stopped, the provision of the notification of the abnormality is continued in step S22. When it is confirmed that the vehicle is stopped in step S23, the process proceeds to step S24 and it is determined whether the shift position is in the P range.

Until it is confirmed in step S24 that the shift position has been brought into the P range, the process is halted. When it is confirmed in step S24 that the shift position has been brought into the P range, it is considered that the vehicle does not move and therefore, it is requested to transmit weak electric power for a short period of time (about 1 second) in step S25. In step S26, it is determined whether the received power voltage is equal to or higher than the threshold value Vt2. In step S26, it is determined whether it becomes possible to receive electric power as a result of the manual adjustment of the vehicle position by the driver. It should be noted that the threshold value Vt2 is set to a value smaller than the threshold value Vt1 as described above with reference to FIG. 11.

When the received power voltage is equal to or higher than the threshold value Vt2 in step S26, the process proceeds to step S28 and transmitting high electric power is started. On the other hand, when the received power voltage is not equal to or higher than the threshold value Vt2 in step S26, the process proceeds to step S27 and the driver is notified of the occurrence of the abnormality that charging cannot be started.

As described above, in this embodiment, after the electric power transmitting unit 220 becomes positioned in the blind spot of the camera 120, transmission and reception of weak electric power is performed between the electric power transmitting unit 220 and the electric power receiving unit 110 and based on the transmission and reception of the weak electric power, the parking assist operation is performed. This makes it possible to accurately designate the parking position even after the electric power transmitting unit 220 becomes positioned under the vehicle.

In addition, control is performed to stop the vehicle 100 when electric power is not received well by the electric power receiving unit 110 even after the vehicle 100 is moved so that the electric power transmitting unit 220 becomes positioned beyond the assumed range. Thus, it is possible to prevent the occurrence of the situation, in which the vehicle 100 is excessively moved and as a result, a front wheel of the vehicle treads on the electric power transmitting unit 220 or the vehicle 100 contacts another obstacle, for example.

In addition, even when the automatic parking is not successfully performed, the electric power is received after confirming whether it is possible to receive electric power when the driver has manually settled the position, at which the vehicle is stopped, so that the opportunity for charging is increased without increasing the need to perform troublesome operations.

Finally, the embodiment is summarized again with reference to the drawings. Referring to FIGS. 1, 6, and 8, the vehicle parking assist system shown in this embodiment includes: the camera 120 that captures the image of an area near the vehicle 100; the first vehicle guiding section (IPA-ECU 410) that recognizes the position of the electric power transmitting unit 220 external to the vehicle based on the image obtained via the camera 120 to guide the vehicle 100 to the electric power transmitting unit 220; the electric power receiving unit 110 that receives electric power from the electric power transmitting unit 220 in a non-contact manner; a second vehicle guiding section (resonance ECU 460) that detects the distance between the electric power transmitting unit 220 and the vehicle 100 based on the electric power received by the electric power receiving unit 110 and guides the vehicle 100 based on the detected distance; and a control section (HV-ECU 470) that causes the vehicle 100 to move by controlling a vehicle driving section (MG-ECU 430) that drives the vehicle, based on outputs from the first and second vehicle guiding sections. The control section (HV-ECU 470) executes a process of stopping the vehicle 100 when the electric power received by the electric power receiving unit 110 from the electric power transmitting unit 220 does not satisfy a first condition that the electric power is equal to or higher than a first threshold value, even after the control section (HV-ECU 470) has caused the vehicle driving section (MG-ECU 430) to move the vehicle beyond a predetermined distance after the first vehicle guiding section (IPA-ECU 410) becomes unable to detect the position of the electric power transmitting unit 220 based on the image. It is preferable that the first threshold value be determined by measuring the relation between the distance between the electric power transmitting unit 220 and the electric power receiving unit 110 and the voltage in advance.

It is preferable that the control section (HV-ECU 470) stop receiving the electric power via the electric power receiving unit 110 and discontinue a guide performed by the second vehicle guiding section (resonance ECU 460) when the electric power received by the electric power receiving unit 110 from the electric power transmitting unit 220 does not satisfy the first condition even after the control section (HV-ECU 470) has caused the vehicle driving section (MG-ECU 430) to move the vehicle beyond the predetermined distance after the first vehicle guiding section (WA-ECU 410) becomes unable to detect the position of the electric power transmitting unit 220 based on the image.

It is more preferable that the control section (HV-ECU 470) end the guide performed by the second vehicle guiding section (resonance ECU 460) and start preparing for charging an electricity storage device 150 on the vehicle via the electric power transmitting unit 220 when the electric power received by the electric power receiving unit 110 from the electric power transmitting unit 220 satisfies the first condition before the vehicle has been moved the predetermined distance after the first vehicle guiding section (IPA-ECU 410) becomes unable to detect the position of the electric power transmitting unit 220 based on the image.

It is preferable that, after the control section (HV-ECU 470) automatically stops the vehicle 100 and discontinues the guide performed by the second vehicle guiding section (resonance ECU 460), the control section (HV-ECU 470) restarts transmitting or receiving the electric power via the electric power receiving unit 110 in response to an instruction from a driver, and the control section (HV-ECU 470) starts charging the electricity storage device 150 on the vehicle via the electric power transmitting unit 220 when the electric power received by the electric power receiving unit 110 from the electric power transmitting unit 220 satisfies a second condition that the electric power is equal to or higher than a second threshold value, and on the other hand, the control section (HV-ECU 470) warns the driver when the electric power received by the electric power receiving unit 110 from the electric power transmitting unit 220 does not satisfy the second condition. It is preferable that the second threshold value be smaller than the first threshold value. In this case, as shown in FIG. 11, the threshold value Vt1 and the threshold value Vt2 are set so as to satisfy the relation, threshold value Vt1>threshold value Vt2. It is more preferable that the second threshold value be determined based on an allowable leaking electromagnetic field intensity that is an intensity of the electromagnetic field that leaks when power transmission and reception at a maximum power output is performed.

It is more preferable that the driver provide the instruction by performing an operation for bringing the vehicle driving section (MG-ECU 430) into a parking state, such as an operation for bringing the shift lever to the parking position or an operation of pushing a parking button.

It is preferable that as shown in FIG. 7, the electric power receiving unit 110 include the secondary self-resonant coil 112, which is an electric power receiving coil that receives the electric power in a non-contact manner via electromagnetic field resonance from the primary self-resonant coil 234, which is an electric power transmitting coil of the electric power transmitting unit 220.

The embodiments disclosed herein are merely examples and should not be considered as restrictive. The scope of the invention is not determined by the above description but by the claims and it is intended to include all the modifications within the scope of the claims and the equivalent thereof.

The invention claimed is:

1. A vehicle parking assist system characterized by comprising:
    a camera that captures an image of an area near a vehicle;
    a first vehicle guiding section that recognizes a position of an electric power transmitting unit external to the vehicle based on the image obtained via the camera to guide the vehicle to the electric power transmitting unit;
    an electric power receiving section that receives electric power from the electric power transmitting unit in a non-contact manner;
    a second vehicle guiding section that guides the vehicle based on the electric power received by the electric power receiving section; and
    a control section that causes the vehicle to move by controlling a vehicle driving section that drives the vehicle, based on outputs from the first and second vehicle guiding sections,
    wherein the control section executes a process of stopping the vehicle when the electric power received by the electric power receiving section from the electric power transmitting unit does not satisfy a first condition that the electric power is equal to or higher than a first threshold value, even after the control section has caused the vehicle driving section to move the vehicle beyond a predetermined distance after the first vehicle guiding section becomes unable to detect the position of the electric power transmitting unit based on the image.

2. A vehicle parking assist method characterized by comprising:
    based on an image obtained via a camera that captures an image of an area near a vehicle, recognizing a position of an electric power transmitting unit external to the vehicle;
    guiding the vehicle to the electric power transmitting unit based on the image;
    receiving electric power from the electric power transmitting unit via an electric power receiving section that receives the electric power in a non-contact manner;
    guiding the vehicle based on the electric power received by the electric power receiving section;
    causing the vehicle to move by performing control to drive the vehicle, according to the guiding based on the image and the guiding based on the electric power; and
    stopping the vehicle when the electric power received by the electric power receiving section from the electric power transmitting unit does not satisfy a first condition that the electric power is equal to or higher than a first threshold value, even after the vehicle has been moved beyond a predetermined distance after it becomes impossible to detect the position of the electric power transmitting unit based on the image.

3. A vehicle comprising:
an electric power receiving section that receives electric power from an electric power transmitting unit in a non-contact manner; and
a controller including a guiding section that guides a vehicle based on the received electric power received by the electric power receiving section, wherein
the controller is configured to perform at least one of requesting the electric power transmitting unit to stop transmitting the electric power, stopping movement of the vehicle providing notification to the operator when the received electric power does not satisfy the predetermined condition even after the vehicle has moved beyond a predetermined distance after the guiding section starts guiding the vehicle, and providing notification to the operator when received electric power that varies as the vehicle moves does not satisfy a predetermined condition while the electric power is transmitted from the electric power transmitting unit.

4. The vehicle according to claim 3, wherein
the controller is configured to perform at least one of the requesting the electric power transmitting unit to stop transmitting the electric power, the stopping movement of the vehicle, and the providing notification to the operator when the received electric power does not satisfy the predetermined condition even after the vehicle has moved a predetermined distance while the electric power is transmitted from the electric power transmitting unit.

5. The vehicle according to claim 3, wherein
the controller includes:
   a vehicle driving section that drives the vehicle, based on an output from the guiding section; and
   a control section that causes the vehicle to move by controlling the vehicle driving section.

6. The vehicle according to claim 3, wherein
the predetermined condition is that the received electric power is equal to or higher than a first threshold value.

7. The vehicle according to claim 3, further comprising:
a detection section that detects the received electric power received by the electric power receiving section.

8. The vehicle according to claim 3, wherein
the controller is configured to request the electric power transmitting unit to start transmitting the electric power when a shift position is changed to a parking range after the electric power transmitting unit is requested to stop transmitting the electric power because the received electric power that varies as the vehicle moves does not satisfy the predetermined condition while the electric power is transmitted from the electric power transmitting unit.

9. The vehicle according to claim 3, wherein
the controller is configured to, after the received electric power that varies as the vehicle moves satisfies the predetermined condition while the electric power is transmitted from the electric power transmitting unit, request the electric power transmitting unit to transmit the electric power that is higher than the electric power that was transmitted from the electric power transmitting unit before the received electric power satisfied the predetermined condition.

10. The vehicle according to 3, wherein
the controller is configured to, after the received electric power that varies as the vehicle moves satisfies the predetermined condition while the electric power is transmitted from the electric power transmitting unit and a shift position is changed to a parking range, request the electric power transmitting unit to transmit the electric power that is higher than the electric power that was transmitted from the electric power transmitting unit before the received electric power satisfied the predetermined condition.

11. A vehicle parking assist system comprising:
an electric power receiving section that receives electric power from an electric power transmitting unit in a non-contact manner;
a guiding section that guides a vehicle based on the received electric power received by the electric power receiving section; and
a control section that causes the vehicle to move by controlling a vehicle driving section that drives the vehicle, based on an output from the guiding section, wherein
the control section is configured to perform at least one of stopping movement of the vehicle, providing notification to an operator, and requesting the electric power transmitting unit to stop transmitting the electric power when the received electric power received by the electric power receiving section from the electric power transmitting unit does not satisfy a predetermined condition even after the control section has caused, through the vehicle driving section, the vehicle to move beyond a predetermined distance after the guiding section starts causing the vehicle to move.

* * * * *